United States Patent [19]

Petrenchik

[11] 4,073,609
[45] Feb. 14, 1978

[54] APPARATUS FOR MOLDING IRREGULAR SHAPES

[75] Inventor: John R. Petrenchik, Pepper Pike, Ohio

[73] Assignee: Mercury Machine Company, Warrensville Heights, Ohio

[21] Appl. No.: 715,857

[22] Filed: Aug. 19, 1976

[51] Int. Cl.² .................................................. B28B 7/04
[52] U.S. Cl. ..................................... 425/442; 425/441; 425/451.4
[58] Field of Search .......... 425/436 R, 436 RM, 438, 425/441, 442, 450.1, 451.2, 451.4, 242 R, 443

[56] References Cited

U.S. PATENT DOCUMENTS

| | | | |
|---|---|---|---|
| 2,204,263 | 6/1940 | Thoresen | 425/441 X |
| 3,915,613 | 10/1975 | Ruch | 425/438 |
| 3,981,671 | 9/1976 | Edwards | 425/450.1 X |

*Primary Examiner*—Richard B. Lazarus
*Attorney, Agent, or Firm*—Baldwin, Egan, Walling & Fetzer

[57] ABSTRACT

Apparatus is provided for molding ceramic cores and patterns to be used for investment casting of blades or vanes for a jet engine, turbine or the like, and having shapes to provide a strong structure with internal passages permitting the flow of a cooling medium. This invention provides a mold having upper and lower mold portions having parting lines in a general horizontal direction. The molded shapes have formations whose surfaces require molding shapes which require withdrawal in lines normal with such surfaces. Such formations described herein relate to the forming of internal passages in the completed blade structure to permit the flow of a cooling medium. The present invention provides pairs of core-forming blocks movably mounted in the upper and lower mold portions and so constructed that after a shape is formed, the blocks may be withdrawn in lines normal with the formed surfaces. To take care of the irregular shapes of such blades or vanes some of these blocks are withdrawn at an angle to certain other of the blocks. The specification describes specifically a negative embodiment of the airfoil part wherein deformations for forming the internal passages in the airfoil part are inwardly turned from the general core surfaces by projections on the core-forming blocks. A second embodiment of a positive embodiment is briefly described as having internal passages in the airfoil part formed by deformations outwardly turned from the general core surfaces by recesses in the core-forming blocks.

4 Claims, 11 Drawing Figures

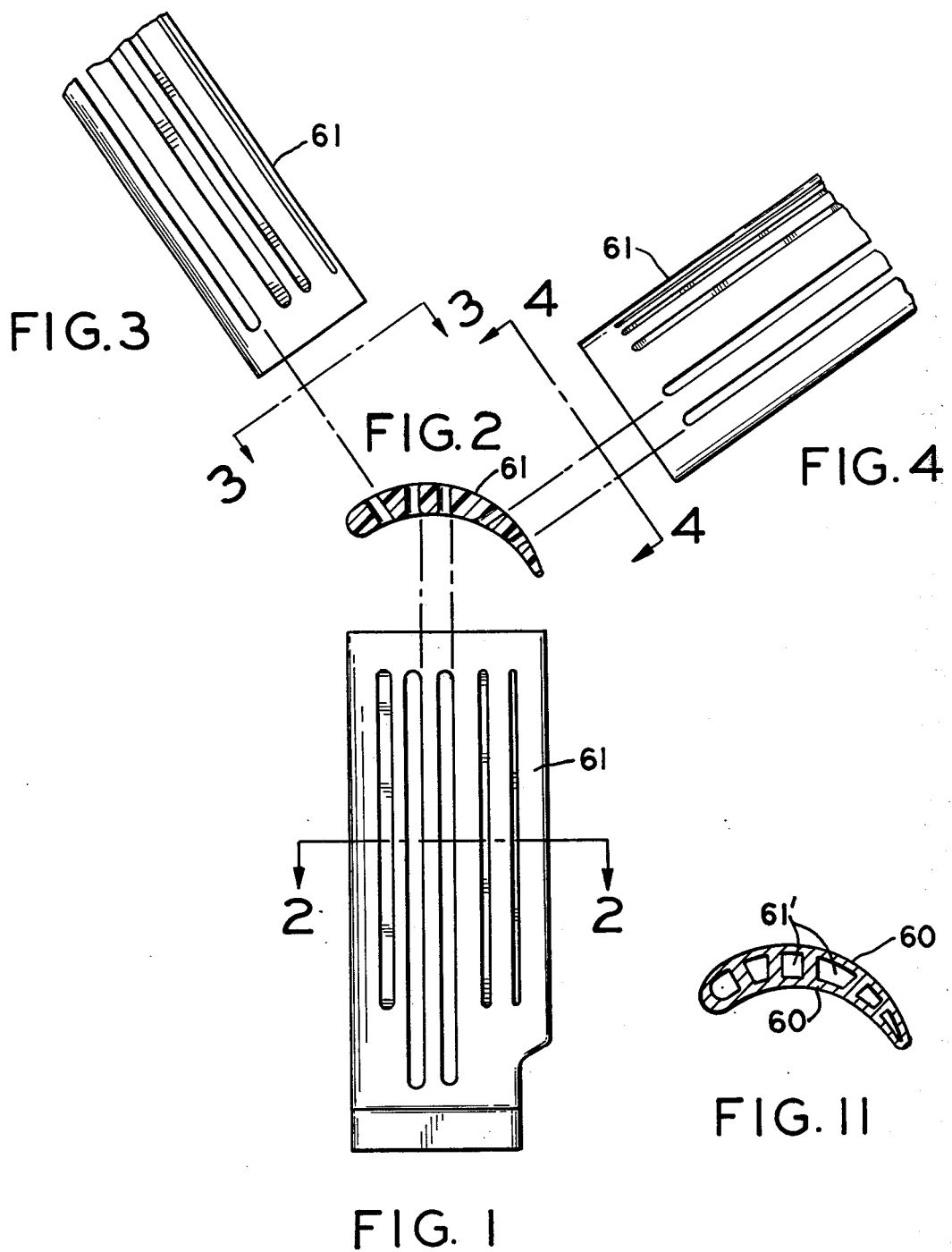

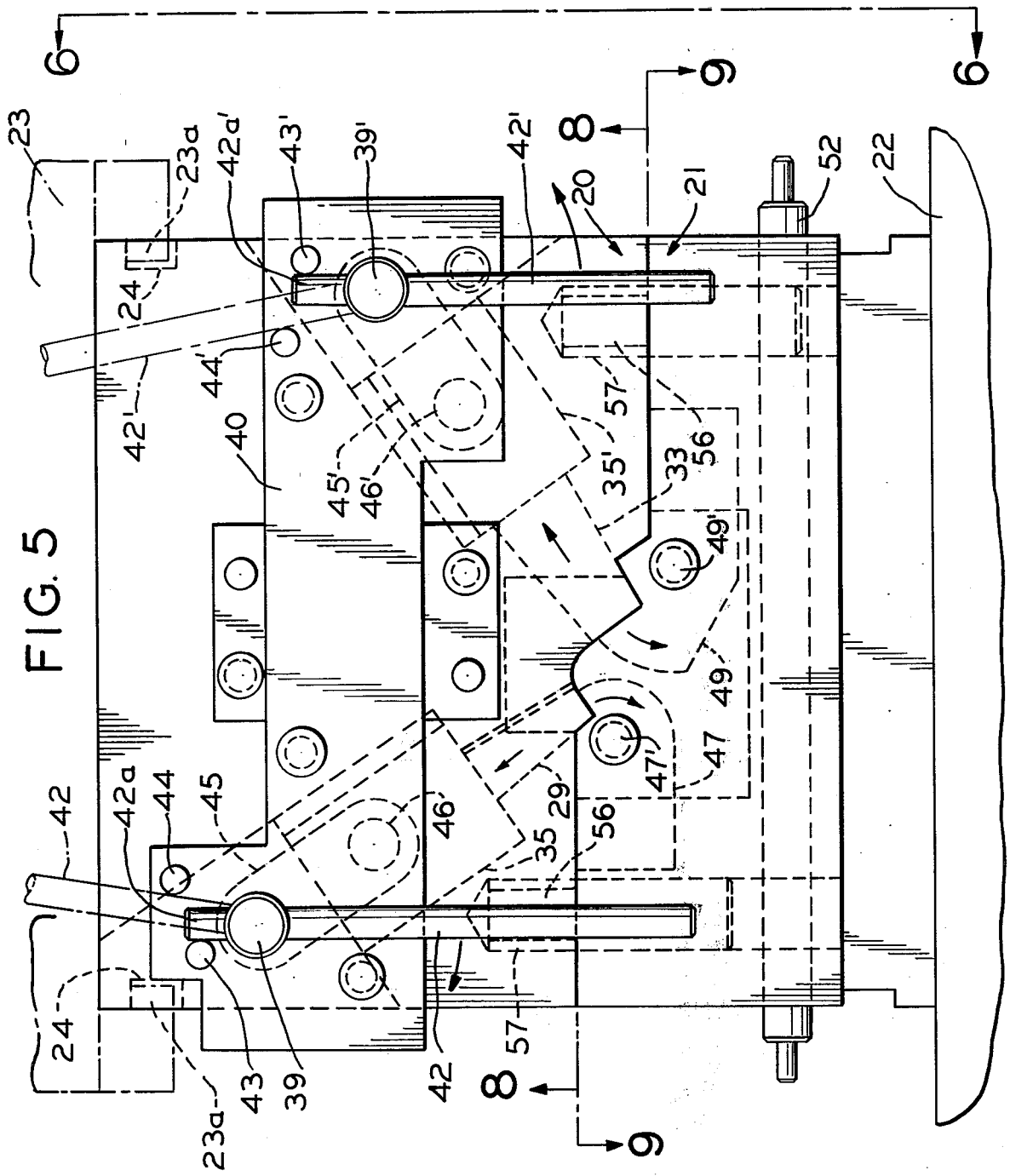

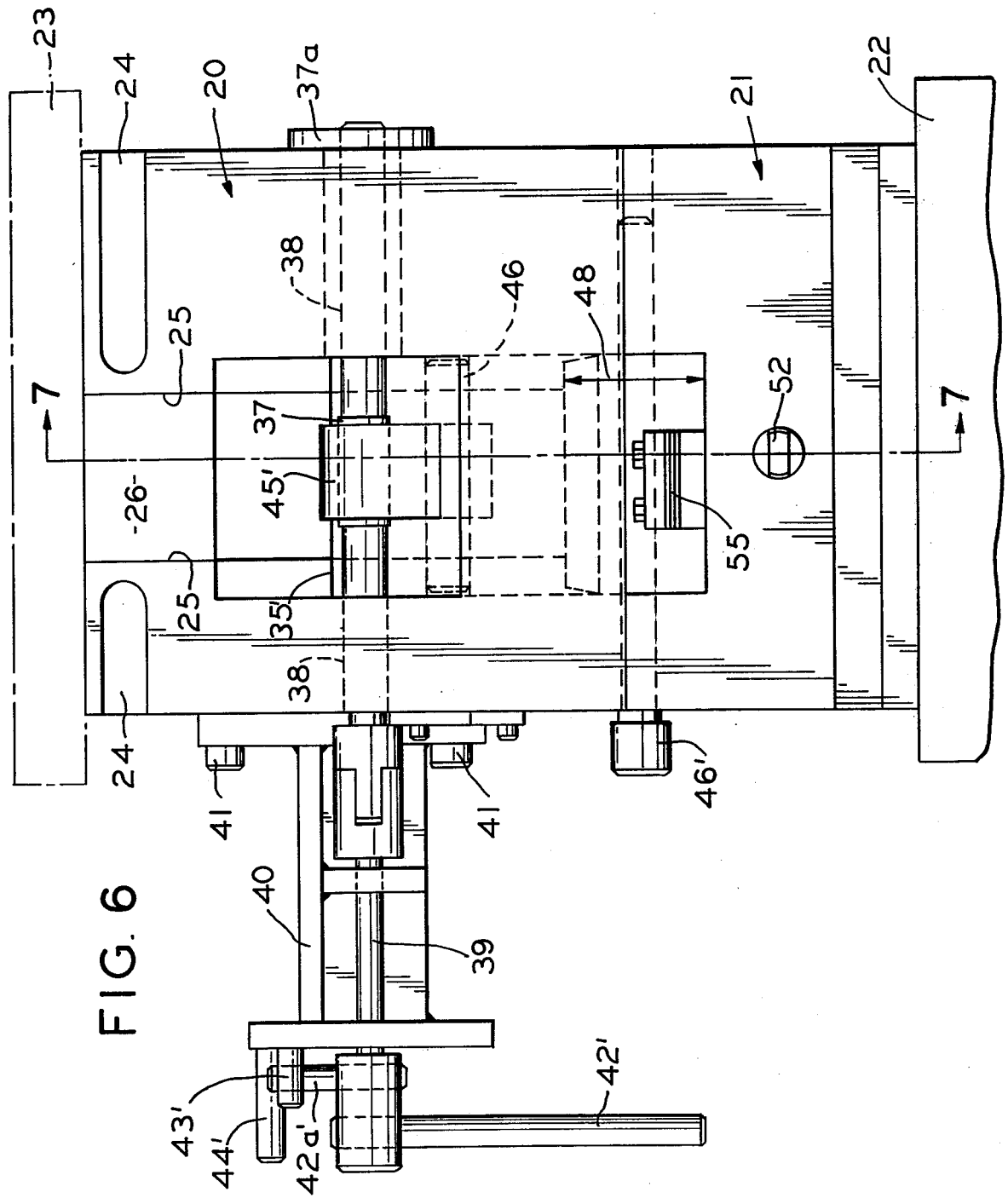

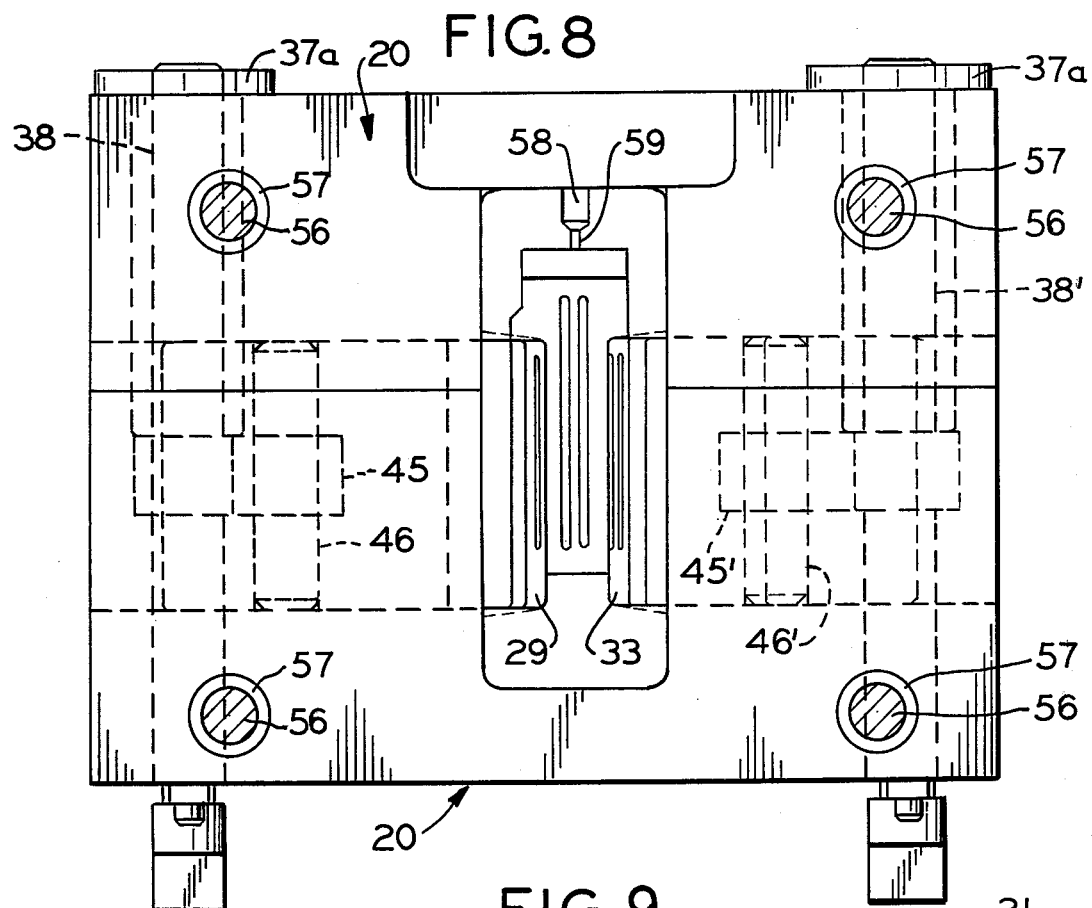
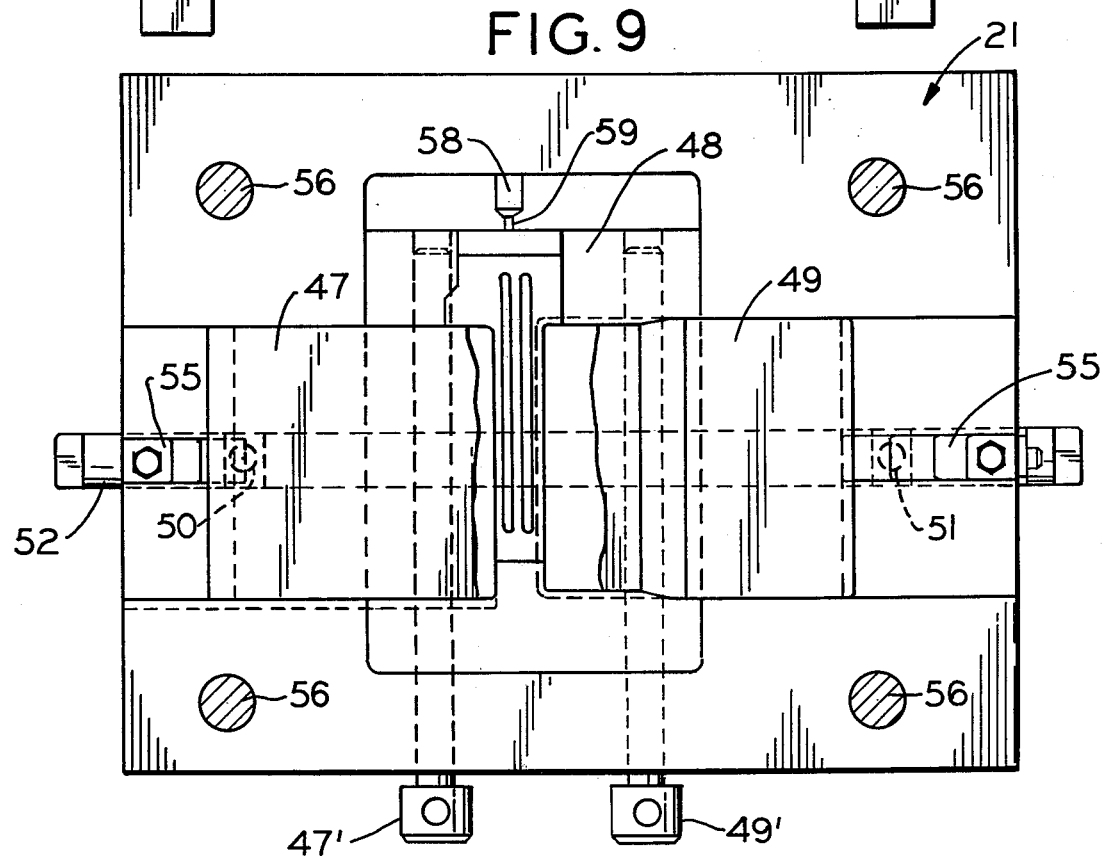

APPARATUS FOR MOLDING IRREGULAR SHAPES

BACKGROUND OF THE INVENTION

Heretofore it was difficult to form airfoil parts, such as a blade, a vane, or the like, for use in a jet engine or turbine or similar structure where deformations in the airfoil part existed in non-parallel planes at different angles to the general plane of the airfoil parts. Such vanes or blades could not be made using the usual equipment of upper and lower horizontal platens and wherein all posts or recesses had to have parallel surfaces normal to the platens. If undercut surfaces were designed extending in different planes at an angle to each other, usually extra removable mold pieces had to be provided which called for partial assembly and disassembly of the mold each time a piece was cast.

The object of the present invention is to provide a mold structure for forming an airfoil part such as a blade, a vane, or the like, having shapes heretofore difficult to cast. The structure disclosed herein includes upper and lower mold portions, completely enclosing a generally horizontal chamber of the shape complementary to a core for the airfoil part, each portion carrying a plurality of blocks, of which each has a partial core-forming surface presented inwardly and each partial core-forming surface including formations turned at approximately 90° to that partial surface complementary to airfoil part passage deformations to be formed which extend at different non-parallel angles between different blocks. These blocks in the present invention are mounted in the upper and lower mold portions on opposite sides of the chamber for forming the airfoil part core and so mounted that each block is withdrawable in a direction normal to the associated airfoil core partial surface.

The accompanying description discloses specific structures for withdrawing the blocks in different directions, at angles to each other, depending upon the structure to be formed.

The structure defined herein in detail involves a negative embodiment of the core structure, wherein a pattern is first formed having certain solid and open portions which, by investment casting, reverses the solid and open parts to provide the desired core which is embodied in a blade or vane. In a later portion of the specification, the changes necessary in the described structure herein will be indicated in order to form a positive embodiment of the core structure which may be directly assembled into the finished blade or vane.

Other objects and advantages of the invention will be apparent from the accompanying drawings and description and the essential features thereof will be set forth in the appended claims.

In the drawings,

FIG. 1 is a top plan view of a blade core structure to be formed in the mold described herein;

FIG. 2 is a sectional view taken along the line 2—2 of FIG. 1 showing the negative embodiment formed by this invention.

FIGS. 3 and 4 show how certain portions of the core structure shown in FIGS. 1 and 2 are produced by core-forming surfaces directly in line with the formation to be produced in the section shown in FIG. 2;

FIG. 5 is a front elevational view of the complete mold;

FIG. 6 is an end view of the same taken along the line 6—6 of FIG. 5;

FIG. 8 is a bottom plan view of the upper mold portion taken along the line 8—8 of FIG. 5;

FIG. 9 is a top plan view of the lower mold portion taken along the line 9—9 of FIG. 5;

FIG. 10 is a partial sectional view taken along the line 10—10 of FIG. 7 while

FIG. 11 is a sectional view showing the completed airfoil part formed by this invention.

The pattern for a negative embodiment of a core part shown in FIGS. 1 through 4 is described herein to avoid unnecessary complications of description. However, it should be understood that this invention may also be applied to parts of various forms including blades or vanes which are warped or partially twisted from one end to the other thereof.

Figure 7:
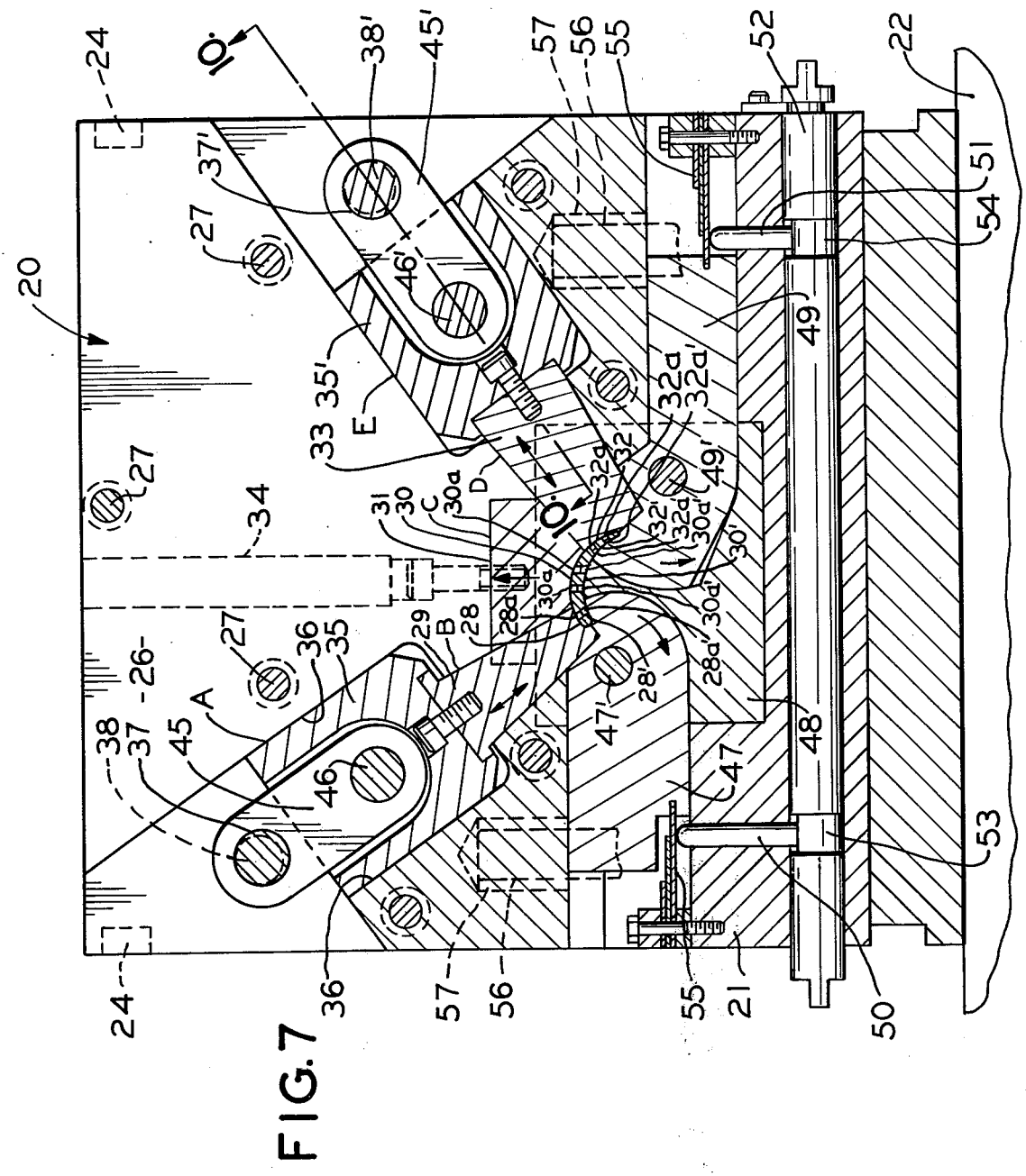
FIG. 7 is a sectional view taken along the line 7—7 of FIG. 6.

The mold of this invention as best seen in FIGS. 5, 6 and 7 comprises an upper mold portion 20 which extends from the top of the view shown in FIGS. 5 and 7 down to the section lines 8—8 and 9—9 in FIG. 5. The lower mold portion 21 extends from that section line of FIG. 5 down to the bottom of the views in FIGS. 5 and 7. As shown in these views, the mold sits on a suitable table 22 and above this table is a press or hoist 23 having portion 23a adapted to enter in pick up slots 24 near the top of the upper mold portion whereby the upper mold portion may be lifted vertically upward and away from the lower mold portion 21.

To aid in assembly of the parts of the mold, the upper mold portion 20 is cut away at the central portion between the parallel lines 25 and this space is later filled by a filler block 26 which extends from the top downwardly to the lines A, B, C, D, and E. This filler block is finally held in its assembled position by bolts 27.

Figure 10:
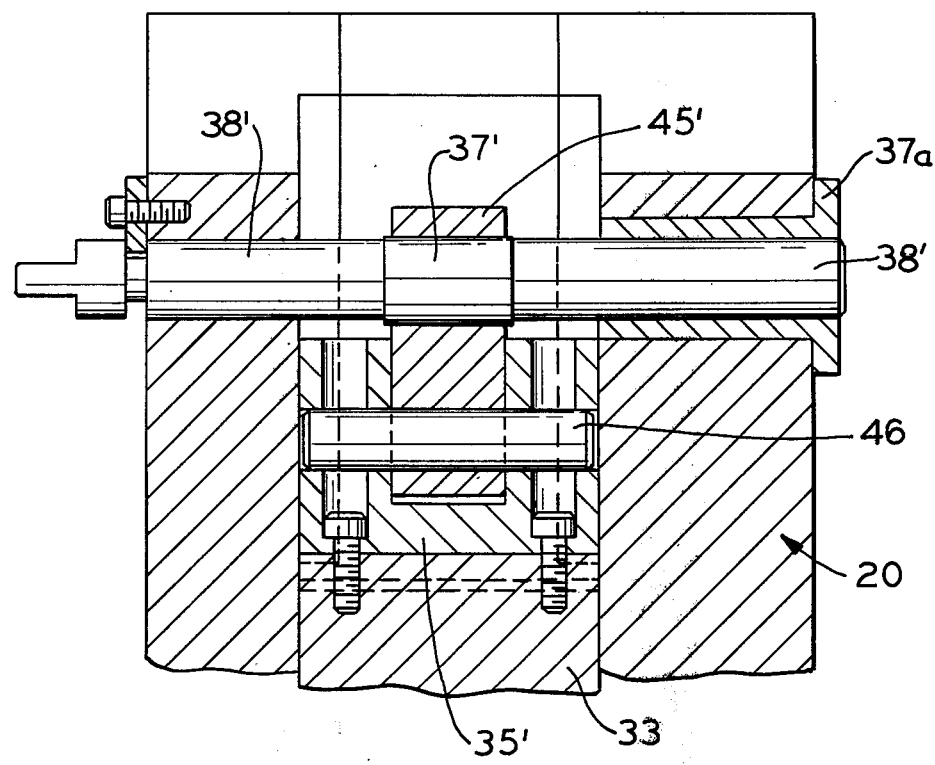

Referring to FIG. 7, the upper core-forming surface portions are shown at 28 on left-hand slide block 29, core-forming surface portions shown at 30 on top cavity block 31, and core-forming surface portions shown at 32 on right-hand slide block 33. The top cavity block 31 is held in fixed position by a structure 34 in the filler block 26. The left-hand slide block 29 and the right-hand slide block 33 are supported by similar structures of which one only will be described. The left-hand slide block 29 is fixed at the lower end of left-hand slide 35 which is guided in ways 36 in the upper mold portion. The slide 35 is moved back and forth by an eccentric cam 37 on an eccentric shaft 38 which is suitably mounted for oscillation in the upper mold portion 20. The mounting includes a suitable bushing 37a as seen in FIG. 10. The eccentric shaft 38 is rotated by a handle extension 39 suitably mounted in a weldment 40 fastened to the side of the upper mold portion 20 by suitable bolts 41. Handle 42 extends through the outer end of the handle extension 39. The handle 42 is shown in FIG. 5 in mold-closed position with a feeler 42a against a closed stop 43. To open the associated mold block, the handle 42 is moved in the direction of the arrow in FIG. 5 a little more than 180 degrees as shown in dot-dash lines and resting against an open stop 44. The same parts for operating the right-hand slide block 33 are shown with the same reference characters with a prime suffix. A link 45 connects the eccentric cam 38 with the slide 35 by means of a pin 44.

It will be noted that the passage core-forming surface projection 28a on the slide block 29 extends substantially normal to surface portion 28 in a straight line running up to the eccentric cam 38 which is eccentric in the direction of withdrawal of the surface portion 28. Like-wise the inwardly projecting passage-forming parts 32a of the slide block 33 are substantially normal to surface portion 32 and directly in line with the pull exerted by the cam 37' through the link 45' on the slide block 33. It is obvious that the inwardly projecting passage forming portions 30a of the top cavity block 31 are substantially normal to the surface portion 30 and directly in line with the vertical movement of the upper mold portion 20, together with parts 26 and 34, when the upper mold portion is lifted away from the lower mold portion as previously described.

On the lower side of the core-forming pattern are coacting partial core-forming portions 28', 30' and 32' respectively opposite the portions 28, 30 and 32 previously described. The surface 28' is carried by a left-hand swing lever block 47. The surface 30' is carried on a bottom cavity block 48 which is fixed in the lower mold portion 21. The surface 32' is carried by a right-hand swing lever block 49. The swing lever block 47 is pivoted at 47' on the bottom cavity block 48. The right-hand swing lever block 49 is pivoted at 49' on the lower cavity block. The swing lever blocks 47 and 49 are operated by pins 50 and 51, respectively, which are slidably mounted in the lower mold portion 21. They are operated by a lower block cam shaft 52 which carries eccentrics 53 and 54 for respectively operating the swing lever blocks 47 and 49. The pins 50 and 51 are urged downwardly by leaf springs 55 carried as seen in FIG. 7 by the lower mold portion. By examination of the location of the inwardly extending projecting passage-forming formations 28a' carried by swing lever block 47, and the inwardly extending projecting passage-forming portions 32a' on the surface 32' carried by swing lever block 49, one will see that a radius from the pivotal mounting 47' to the mold forming parts 28a' is substantially at right angles to a line passing centrally through the mold portions 28a and 28a' so that oscillation of the swing lever block 47 in a clockwise direction as seen in FIG. 7 will move the portion 28a' initially normal to surface 28' and axially of projecting fromation 28a'. Likewise, on the right-hand side of FIG. 7 a radius from the pivot 49' to the mold forming portions 32a' is at right angles to the line passing axially through parts 32a and 32a' so that oscillation of the swing lever block 49 in a counterclockwise direction as seen in FIG. 7 will withdraw the parts 32a' initially normal to surface 32' and axially of projecting formation 32a'. It is obvious, as seen in FIG. 7, that the separation of the top cavity block 31 directly vertically upward from the bottom cavity block 48 will separate the formations 30a axially from the formed airfoil core part.

It will be understood that the portions 28, 30, and 32 on the upper side of the airfoil part, and the parts 28', 30' and 32' on the opposite side of the airfoil shape have an extent lengthwise (that is at right angles to the paper in FIG. 7) equal to the distance in the filler block between the parallel sides 25.

When the upper and lower mold portions are assembled to the closed position shown in FIG. 7, rigid posts 56 on the lower mold portion enter firmly into bushings 57 in the upper mold portion to attain perfect registration of the two mold portions in assembled condition.

With the mold in closed position, a suitable gate 58 is provided as seen in FIGS. 8 and 9 having communication channels 59 leading into the enclosed space to be occupied by the airfoil part when cast in this mold. The flowable material, in the present case, ceramic core material, but which could be wax or thermoplastic synthetic resin material, is brought under pressure into communication with the gate 58 for the purpose of molding the airfoil form.

In utilizing the mold of the invention, the mold parts are placed in closed position as seen in FIG. 7, and other of the drawings, and the core pattern as shown and described herein is filled with a usual investment wax or thermoplastic synthetic resin material to completely fill the pattern chamber. Thereafter, when the airfoil core part has hardened, the upper eccentric shafts 38 and 38' are oscillated by means of the handles 42 and 42' which handles are turned in the direction of the arrows in FIG. 5, 42 in a clockwise direction and 42' in a counterclockwise direction, from the closed position with the handle 42a and 42a' against the closed stop 43 or 43' and the handles then being turned a little over 180° until the handles rest against the open stops 44 and 44' as shown in dot-dash lines in FIG. 5. The lower block cam shaft 52 is rotated to force the pins 50 and 51 upwardly as seen in FIG. 7 to cause the swing lever block 47 to oscillate slightly in a clockwise direcion and to cause the swing lever block 49 to oscillate slightly in counter-clockwise direction from the position seen in FIG. 7. It will be noted that in releasing the formed airfoil shape from the forming chamber as seen in FIG. 7, it is only necessary to move the inwardly extending parts 28a and 32a, just so that they clear the space occupied by the airfoil part 61. Then the upper mold portion 20 may be raised vertically away from the lower mold portion 21, and then the swing lever blocks 47 and 49 are oscillated to remove parts 28a' and 32a' from part 61, so that the completed airfoil core pattern may be lifted off projections 30' and removed from the mold.

The part 61 as formed is shown in section in FIG. 2 This ceramic core is next placed in a wax injection mold to complete the outer detail 60 in wax as seen in FIG. 11. Then the core-wax combination is enclosed in a shell mold in a known manner, usually involving a first coat of a ceramic coating containing only very fine ceramic particles, followed by other dip coats of different viscosity and usually containing different grading of ceramic particles. After each dip, coarser stucco material is applied to the still wet coating. This shell mold is then hardened and heated whereby to cause the molten wax or plastic to empty the cavity. The finished blade or vane then appears as shown in section in FIG. 11 where the enclosing shell is shown at 60 and the reverse form of the pattern 61 shown in FIG. 2 now appears in the hollow portions 61' in FIG. 11.

The description of the use of this invention has thus far been limited to the formation of negative embodiment of the airfoil part. Those familiar with this art, will understand that the inwardly turned passage-forming parts 28a, 30a, 32a, and 28a' and 30a' and 32a' could be turned outwardly instead of inwardly and this invention could then be used to case such a positive embodiment of an airfoil part as heretofore described in this specification. In such a case, the positive part, so formed, is then housed in a shell mold in which steel or other suitable metal is cast and the positive embodiment of the core will provide the cooling passages for the finished blade or vane.

This invention provides great freedom of design of internal structure for blades, vanes, turbine wheels and the like and is not limited to the specific structure described herein.

Suitable electrical heating elements may be introduced into the mold portions wherever the same are necessary.

What is claimed is:

1. Mold structure for forming a core shape for incorporation in an airfoil part, such as a blade, a vane or the like, and said airfoil part core having passage-forming deformations with surfaces extending in at least two non-parellel planes; said mold structure comprising an upper mold portion and a lower mold portion having complementary interfitting faces between them, defining a generally horizontal chamber curving in section, and separable in a given generally vertical direction, said horizontal chamber having a generally convex upper surface and a generally concave lower surface; interfitting parts extending from one side mold portion into said other mold portion to insure exact registration when said two mold portions are assembled; coacting core-forming blocks movably held part in said upper mold portion and part in said lower mold portion; each of said blocks having a core-forming partial surface presented inwardly thereof including passage-forming formations complementary to said airfoil core part deformations to be formed; said passage-forming formations having surface portions at right angles to the associated partial surface requiring said blocks to be withdrawn at right angles to said partial surface portions respectively; some of said blocks being withdrawable in a direction different from the direction of withdrawal of others of said blocks; all of said core-forming partial surfaces on all of said blocks coacting to completely enclose said airfoil core part in said generally horizontal chamber when said blocks are in their innermost positions; gate means communicating with said chamber for introduction of molding material into said closed chamber; means moving said blocks held in said upper mold portion at right angles to the asssociated core-forming partial surface inwardly to enclose said chamber and means moving said blocks held in said upper mold portion at the same right angle outwardly, each in line with the associated passage-forming formation surfaces, sufficient to release an airfoil part from said chamber; at least two of said core-forming blocks held in said lower mold portion are spaced apart and having passage-forming formations at two different angles to the direction of separation of said two mold portions; said means moving each of said blocks initially in line with said passage-forming formation surfaces comprises a swing lever block having a pivotal mounting in said lower mold portion; a radius from said pivotal mounting to said associated partial formation surface in its innermost, chamberclosing position is substantially at rignt angles to said direction of withdrawal axially in line with said associated formation surface, whereby upon initial pivoting of said swing lever block to release the finished core shape the swing lever block is caused to move said passage-forming formations substantially along its axis; and another block held in said lower mold portion between said spaced two blocks has passage-forming formations complementary to said airfoil part deformations lying in a plane parallel to the direction of separation of said two mold portions; and means moving said two mold portions apart.

2. Mold structure as defined in claim 1, wherein two of said core-forming blocks are opposed on opposite sides of said generally horizontal chamber and have formations complementary to said airfoil part passage-forming deformations lying in a plane parallel to the direction of separation of said two mold portions; and wherein at least said two of said core-forming blocks have passage-forming formations on directly opposite sides of said chamber at an angle to the direction of separation of said two mold portions; an upper one of said last named two blocks has means for moving the same normal to the named associated partial formation surfaces comprising a slide having a mounting in said upper mold portion guiding said slide for reciprocation parallel to said normal; one of said blocks being a slide block mounted on the inner end of said slide; and said means for moving said one block includes an eccentric shaft oscillatably mounted in said upper mold portion; said eccentricity of said shaft being in the direction of said normal; there being a pin in said last named slide at right angles to said normal; a link connecting said pin and said eccentric shaft; and means for oscillating said shaft; a lower one of said last named two blocks has means for initially moving the same in line with the axis of the named associated passage-forming formation surfaces comprising a swing lever block having a pivotal mounting in said lower mold portion; and a radius from said pivotal mounting to said associated passage-forming formation surface in its innermost-chamber-closing position is substantially at right angles to said direction of withdrawal normal to said associated partial formation surface, whereby upon initial pivoting of said swing lever block to release the finished core shape the swing lever block is cause to move said passage-forming formation substantially along its axis.

3. Mold structure as defined in claim 1, wherein said formations complementary to said airfoil part passage-forming deformations extend inwardly to provide a negative embodiment of said core shape.

4. Mold structure as defined in claim 1, wherein said formations complementary to said airfoil part passage-forming deformations extend outwardly to provide a positive embodiment of said core shape.

* * * * *